United States Patent [19]
Olson

[11] Patent Number: 5,925,998
[45] Date of Patent: Jul. 20, 1999

[54] ENERGY SAVING MOTOR CONTROL DEVICE

[76] Inventor: Eric O. Olson, Unit 30, 6440-4th St. N. W., Calgary, Alberta, Canada, T2K 1B8

[21] Appl. No.: 08/897,322

[22] Filed: Jul. 21, 1997

[51] Int. Cl.[6] ...................................................... H02J 3/14
[52] U.S. Cl. .......................... 318/484; 318/434; 307/66; 307/39; 307/35
[58] Field of Search ....................... 318/32–40, 430–484, 318/729, 778; 307/46–66, 41; 361/20–32

[56] References Cited

U.S. PATENT DOCUMENTS

| | | | |
|---|---|---|---|
| 4,324,987 | 4/1982 | Sullivan et al. | 307/35 |
| 4,336,462 | 6/1982 | Hedges et al. | 307/35 |
| 4,357,165 | 11/1982 | Shook | 307/35 |
| 4,499,385 | 2/1985 | Slavik | 307/10 R |
| 4,510,398 | 4/1985 | Culp et al. | 307/35 |
| 4,617,472 | 10/1986 | Slavik | 307/10 R |
| 4,645,940 | 2/1987 | Wertheim | 307/66 |
| 4,656,835 | 4/1987 | Kidder et al. | 62/175 |
| 4,694,192 | 9/1987 | Payne et al. | 307/39 |
| 4,916,328 | 4/1990 | Culp, III | 307/39 |
| 5,034,622 | 7/1991 | Kuzmik | 318/434 |

*Primary Examiner*—Paul Ip
*Attorney, Agent, or Firm*—Fitzpatrick, Cella, Harper & Scinto

[57] ABSTRACT

A device which intervenes between an electric switch and a motor which it controls, such intervention reducing the number of times the motor is powered on by keeping the motor running. The device calculates the difference in the amount of energy used in starting compared with normal running. Then, it calculates how long the motor must be turned off, if turning it off is to be economical. If the motor is turned off for a period which is not economical, the motor control device will intervene and keep the motor running until it is no longer economical to keep it running. In applications where an industrial tool is being used so frequently that it is being stopped, then started again in short intervals, this device would keep the tool running constantly until a sufficient period since the last use has lapsed and the device is allowed to shut the motor off.

18 Claims, 6 Drawing Sheets

ENERGY SAVING MOTOR CONTROL DEVICE

FIELD OF THE INVENTION

The invention relates to motor controls. More particularly, it relates to motor controls with energy conservation features.

BACKGROUND OF THE INVENTION

Many industrial tools require electric motors which are relatively large consumers of electric energy. Some tools are used by many persons sharing the same work area. As one worker shuts down a machine and leaves the area, another worker walks up and turns it on again. Quite often the tool motor has not had a chance to shed the residual heat from its initial startup. As a result, the frequent re-starting causes abnormally high running temperatures, and premature need for expensive maintenance. Furthermore, the cost of such premature wear and tear uses a great deal of electricity. In all such cases, the metered amount of energy consumed by the motor is greater than the rated energy consumption under normal loading.

Some typical examples are: dryers at the exits of automatic car washes, belt sanders, electric presses, and electric bending brakes.

Until now, the standard solution is to employ an intelligent electronic device (IED) such as a programmable logic controller (PLC) between the start/stop switch and the motor's own load relay. These devices would be programmed to do one of two things: 1) Delay the reaction time to turn off the load relay a preset number of seconds, then turn off the motor. If the motor is turned back on before the PLC times out, the delay is interrupted. 2) Calculate the length of time the motor is being turned off, then compare it against a fixed preset length of time. If the "off-time" is shorter than the preset, the motor is kept running until the opposite is true. The preset must be manually calculated for each motor, and does not dynamically adjust as the motor ages.

The IED or PLC needed for this type of intervention is too complex for most electricians to employ due to the knowledge required for programming. Also, the costs of these devices still rivals the cost of the motor replacement. Unless a great deal is known about the motor, and PLC programming, there is no way to know if the solution is cost feasible until a great deal of time has passed and sufficient quantitative billing information is gathered.

There is a need for a device which addresses these problems.

It is an object of the invention to provide alternative means of entering calculated numerical information into computers.

SUMMARY OF THE INVETION

In one aspect, the invention provides a control system with a load, a load power source, an external control signal, and a control device. The control device is connected between the power source and the load. The control device receives the external power signal. The control device measures the amount of energy consumed by the load during start-up and measures the rate of energy consumption by the load during steady state-. The control device determines the amount of time the load will take to consume the same energy in steady-state that the load consumes during start-up ("the equivalency time"). The control device connects the power source to the load after the external signal indicates that the load should be disconnected from the power source for the equivalency time. The control device disconnects the power source from the load unless the external signal indicates within the equivalency time that the power source should be reconnected to the load.

The control system may also have a power sensor for sensing the power consumed by the load at any one time, and a processor for accumulating the total energy during start-up and determining the equivalency time.

The load may have a load relay and a motor. In this case, the control device connects the power source to the motor, and disconnects the power source from the motor, by switching the load relay.

The control device may have a signal sensor for sensing the state of the external signal and passing the state to the processor. The control device may determine the equivalency time each time the control device connects the load to the power source.

The control device may detect load current faults and interrupt current to the load relay as a result of detecting such a fault. The control device may permit normal operation of the load relay in the event of internal control device failure.

The control device may provide a user-activated display of instantaneous current, normal load current, highest peak current, and accumulated energy savings. The control device may not be limited to any single type of electric motor, nor any range of operating current by virtue of accepting input transducers of different scaling ratios and current handling specifications, including three phase input transducers which combine the effects of the three power phases into one output potential.

The control device may be provided separately from the control system. The control device may have means for activating a connection between the power source and the load, means for receiving the external power signal, means for measuring the amount of energy consumed by the load during start-up, means for measuring the amount of energy consumed by the load over time during steady state, means for determining the amount of time the load will take to consume the same energy in steady-state that the load consumes during start-up ("the equivalency time"), means for activating a connection between the power source and the load after the external signal indicates that the load should be disconnected from the power source for the equivalency time, and means for activating a disconnection between the power source and the load unless the external signal indicates within the equivalency time that the power source should be reconnected to the load.

BRIEF DESCRIPTION OF THE DRAWINGS

For a better understanding of the present invention and to show more clearly how it may be carried into effect, reference will now be made, by way of example, to the accompanying drawing which show the preferred embodiment of the present invention and in which.

DETAILED DESCRIPTION OF THE PREFERRED EMBODIMENT

Figure 1:
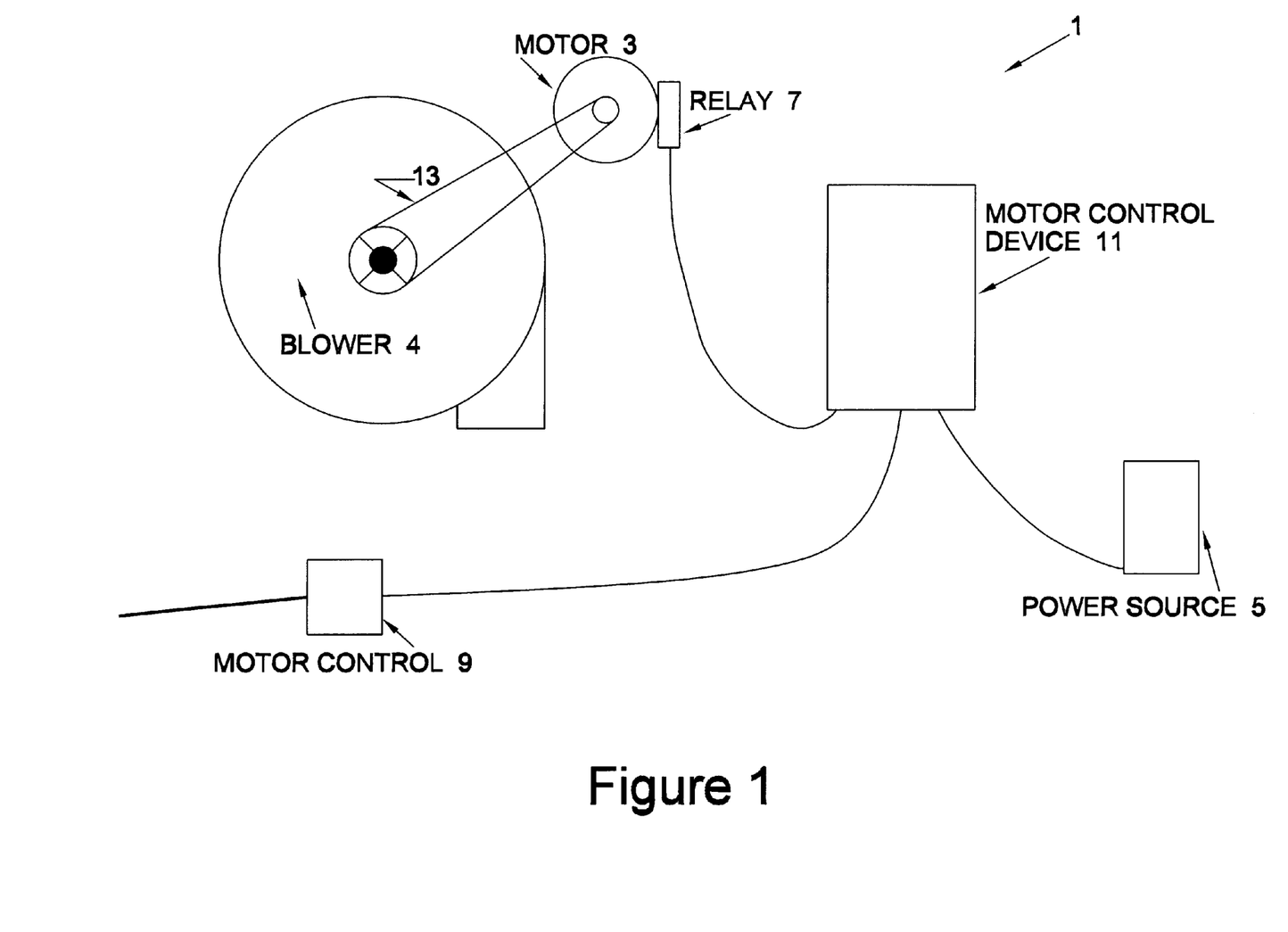
FIG. 1 is a sketch of an industrial control system employing a motor control device according to the preferred embodiment of the present invention.
Figure 2:
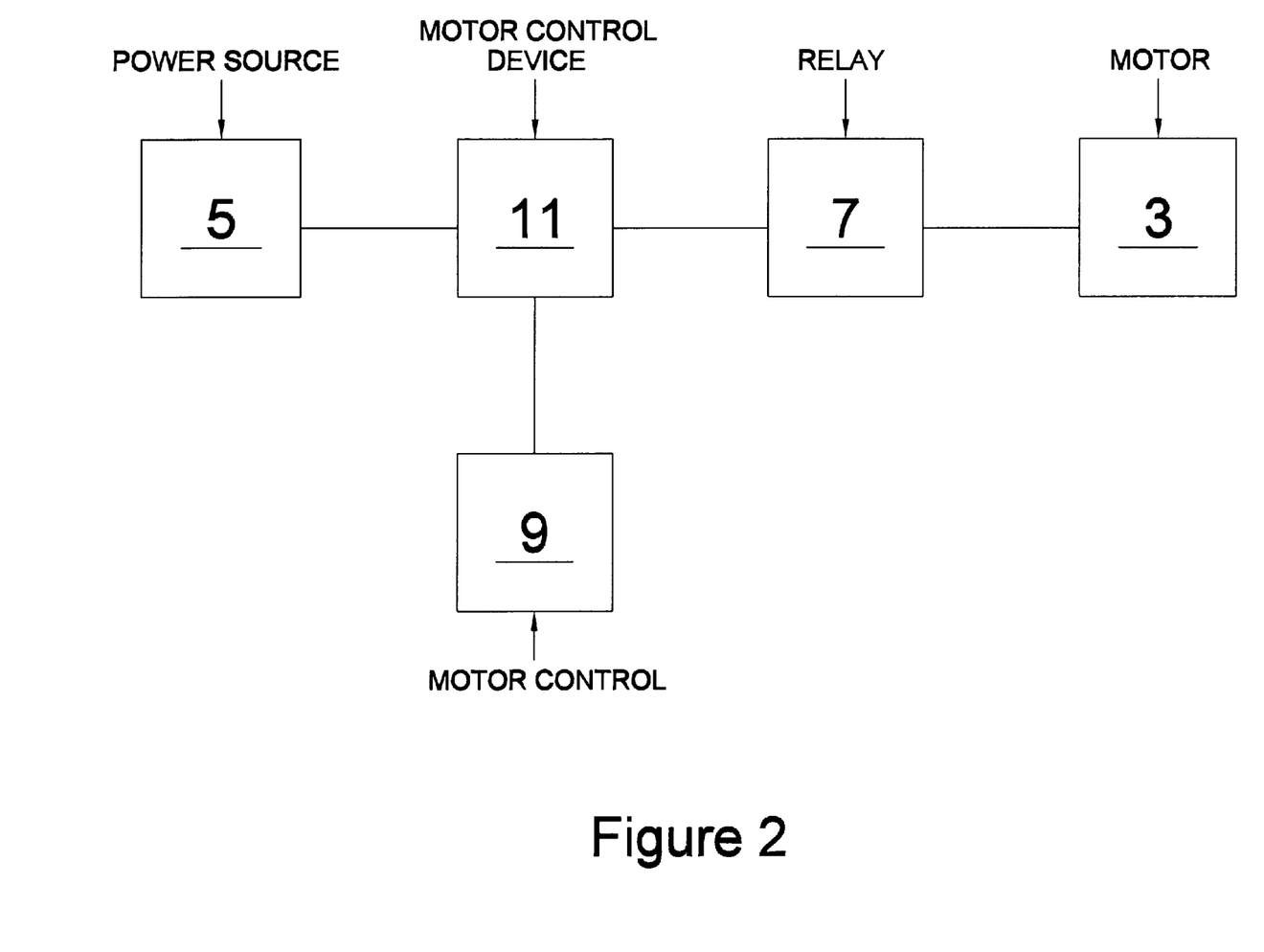
FIG. 2 is a block diagram of the control system of FIG. 1.

Referring to FIGS. 1 and 2, there is a control system 1 with a load 3, load power source 5, relay 7, a motor control 9 and a motor control device 11. As an example, the load 3 may be a motor 3 of a tool 4, such as a blower 4 driven through belt 13.

The motor control 9 may be a simple on/off switch, not shown, with its own source of control power, not shown, to activate the relay 7. The relay 7 acts as remotely controlled switch taking signals from the control 9 to make or break the connection between the motor 3 and the source 5.

The device 11 intercepts the signals from the control 9 to break the connection between the source 5 and the motor 3. The device 11 monitors trends in the amount of power used during start-up, and trends in the length of time for which the motor 3 is turned off between uses. Data from these trends is used to calculate the time taken in a steady state to use up the same amount of energy consumed during start-up. This may be called the "steady state start-up equivalency time". Based on these trends the device determines whether or not it should activate itself. While activated, the device 11 determines if the motor 3 would be likely to waste power in turning off and re-starting versus remaining on for a period of time then the device 11 signals the relay to maintain the connection between the source 5 and the motor 3 for that period of time. If the device 11 does not receive a signal from the control 9 to turn on the motor 3 within that period of time then the device 11 signals the relay 7 to shut-off the motor 3 by breaking the connection between the source 5 and the motor 3. If the device 11 does receive a signal within that period of time then the device 11 remains activated and the connection between the motor 3 and the source 5 is maintained until the device 11 deactivates itself.

The determination of the amount of power used by the motor 3 during start-up and in steady state is determined by the device 11 through actual measurement for the particular motor 3 while in use. The device 11 adjusts the length of time the connection between the source 5 and the load 3 is maintained after the control 9 signals that the connection should be broken.

The device 11 remains activated as long as there is a command from motor control 9 to turn on the motor 3. When the command from the motor control 9 is discontinued, the device 11 will remain activated for at least as long as the "steady state equivalency time". At the moment the command is discontinued the energy used to keep the motor 3 running is subtracted from the calculated net energy savings as it is being used up. If the motor control 9 commands the motor 3 to turn on again before the equivalent energy is used up, the surge energy value is added to the net energy savings. If no command is received, the device 11 is deactivated as soon as the "steady state equivalency time" expires. For this last attempt to maintain the motor 3 in a steady state, no energy savings are realized, and the energy used to maintain the steady state has been subtracted from the net energy savings. In summary, for every interval that the motor control 9 commands the motor 3 to turn off and the motor 3 is kept running by device 11 until the next command to turn on there is a net energy saving. These energy saving intervals tend to be contiguous due to trends in busy periods of tool usage.

As will be discussed further below, control device 11 also utilizes the energy measurements to display operating characteristics of the motor 3, such as normal current i.e. during steady state, peak current, instantaneous current and energy savings. These parameters can be used to determine the operating characteristics of the motor 3. This is particularly helpful in performing preventive maintenance.

Figure 3:
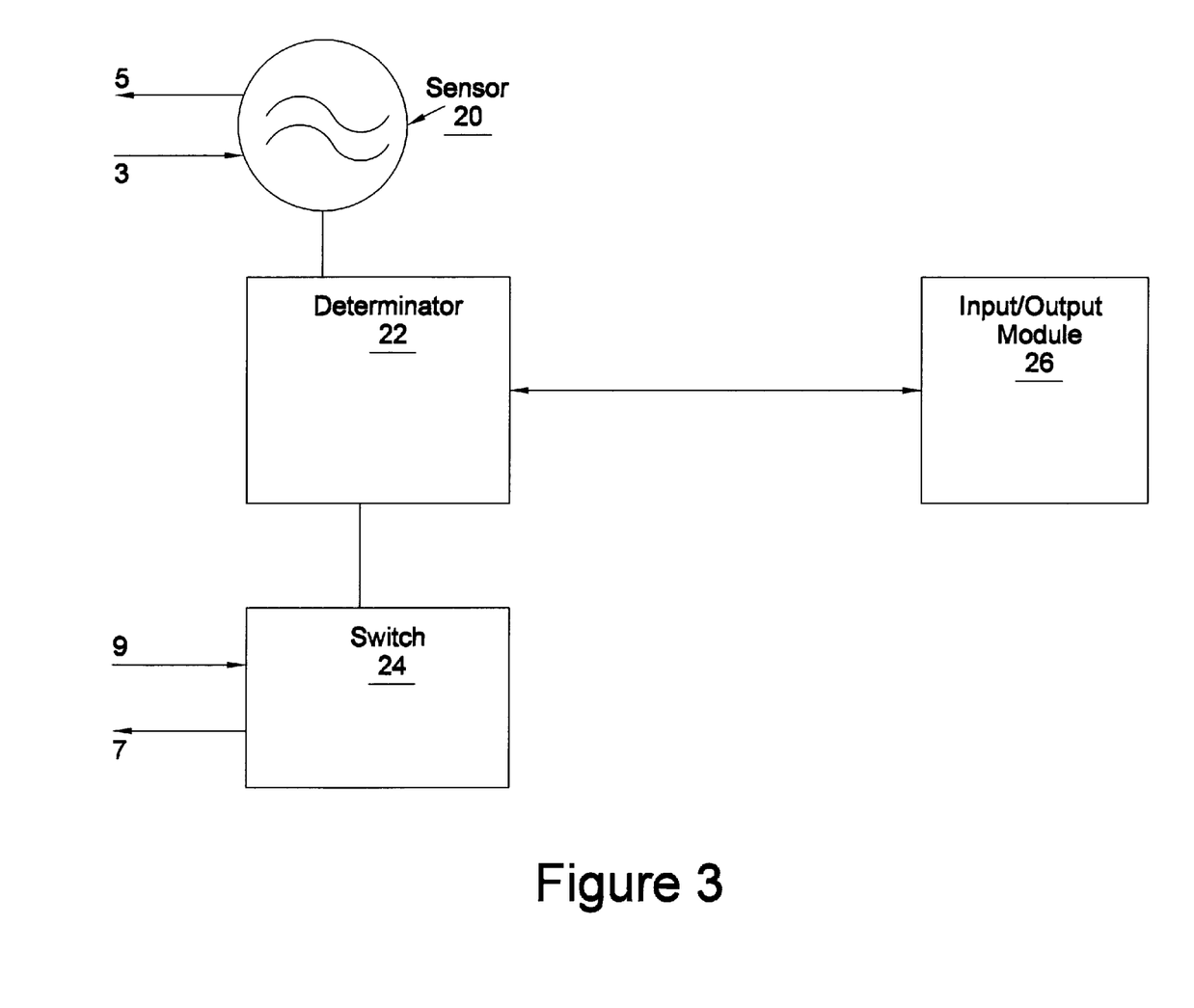
FIG. 3 is a block diagram of the motor control device of FIG. 1.

Referring to FIG. 3, the control device 11 has a sensor 20 that is connected between the power source 5 and the motor 3. It senses the current draw by the motor 3. As the system 1 is running at a constant voltage, typically 120 volts AC, the sensor 20 effectively senses the power drawn by the motor at any one time.

A determinator 22 sums the power sensed by the sensor 20 over time in order to determine the amount of energy drawn by the motor 3. During start-up the determinator 22 measures the energy consumed by the motor 3. The determinator 22 also measures the power draw during steady-state. The determinator 22 determines a length of time the connection between the source 5 and the load 3 should be maintained after the control 9 signals that the connection should be broken.

The determinator 22 is connected to a switch 24 that receives the signal from the control 9 and is connected to the relay 7. If the determinator 22 determines that the signal from the control 9 should be passed to the relay 7 then the switch 24 connects the control 9 to the relay 7.

An input/output module 26 displays various calculations and readings from device 11. A user may select the information to be displayed through the module 26.

Figure 4:
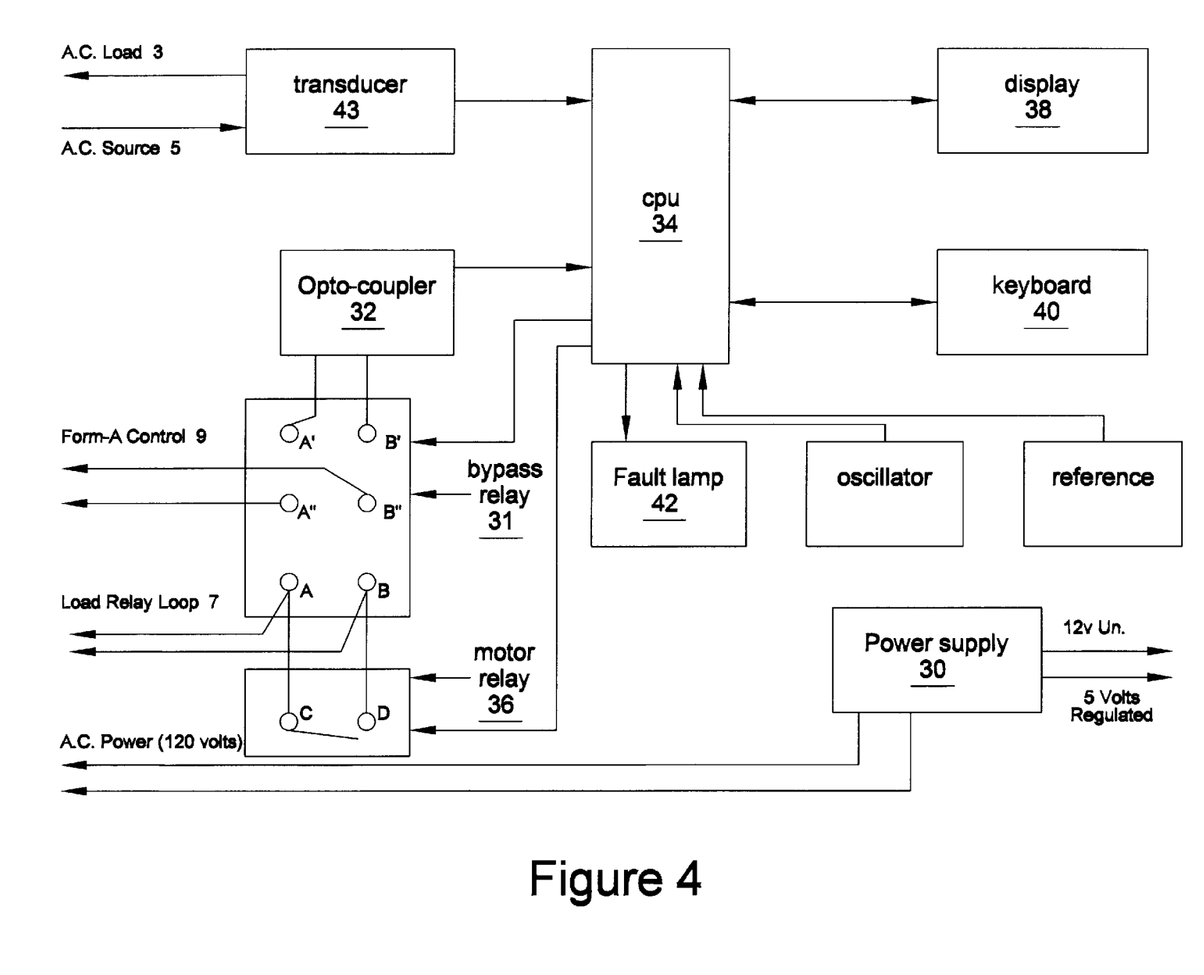
FIG. 4 is a detailed block diagram of the motor control device of FIG. 1.

Referring to FIG. 4, the device 11 is connected between the load relay 7 and whatever control 9 is used to interrupt the flow of current to the load relay 7. In order to do so, it is necessary to connect the motor control device 11 in series with the load relay 7 and its associated control 9.

Also, the motor control device 11 must be able to sense the current flow through the motor 3 itself. To do this, it 11 must be connected in series with the motor 3 and its associated power source 5.

In the preferred embodiment, the motor control device 11 needs its own power source 30 of 120 a.c. volts.

When the device 11 has properly started up bypass relay 31 closes contacts A" to A' and B" to B'. The device 9 senses when there is a demand to turn the motor 3 off or on. This is done through an opto-coupler 32. This signal is converted to TTL, debounced, and then passed on to a processor (CPU) 34. The CPU 34 contains a program that controls the control device 11 to preform the functions described herein. The CPU 34 uses this signal to determine the length of time for which the motor 3 is commanded to be turned off. Whether or not the motor 3 will turn off during these commands depends on whether the device 11 has determined to intervene in the command.

At the moment the motor 3 is commanded to turn on by the control 9, the motor control device 11 begins calculating the amount of energy used during the start-up surge. Then, this surge energy value is averaged with the past surge calculations, to smooth out irregular or abnormal conditions during the start-up.

Once the average surge energy is determined, the motor control device 11 determines what the normal load current is by waiting for the fluctuations in current to settle down. This normal current value is then used to calculate how long the motor 3 could run on the average amount of excess energy used up during start-up. This time is said to be the "optimum off-time", or, the minimum amount of time that the motor 3 should be at rest if turning it off is to make economical sense.

Whenever the motor 3 is commanded to be on, the CPU 34 reads the signal from the opto-coupler 32 and passes it to the load relay 7 through motor relay 36 by closing contact C to D and, thus, the relay 7 loop. In this way, the motor 3 is controlled on and off just as if there were no intervening device 11. The motor control device 11 will then wait until such a time that the length of time between last use and next use is shorter than the optimum off-time. It 11 then determines that the tool 4 for which the motor 3 is working is being used too frequently to allow it to turn off for such short periods. It is at this moment that the device 11 becomes self-activated. The device 11 is said to have entered a state called "cruise control". Under these conditions the motor relay 36 will remain energized, keeping the motor 3 running, until such a time that the interval between tool 4 uses increases and it becomes economical to let the motor 3 come to a full stop between uses. At this moment the device 11 deactivates itself and is no longer in the state of "cruise control". While device 11 is deactivated (not in "cruise control") it is just as if the motor control 9 is directly connected to relay 7. No energy is wasted by keeping the motor running needlessly.

For each time the tool 4 is commanded to turn off (whether by an operator or an automated means) and it is kept running instead by the motor control device 11, the amount of energy saved by not allowing a power surge is calculated and added to a running total of energy saved. This value is expressed in kilowatt-hours, and is displayed on display 38 by pressing a button on keyboard 40. In this way, a person can see the energy savings and determine part of the economical feasibility within a relatively very short period of time. The motor control device 11 calculates the energy saved by subtracting the energy used while the motor 3 is kept running. Once the saved energy is expended, the motor 3 is allowed to shut off. When the motor shuts off in this manner the energy used to keep it running is subtracted from the net energy saved. A summary of applied calculations is set out further on in this description to show how the Net Energy Saved and other parameters may be determined.

Whenever a fault indication occurs, the motor control device 11 locks itself in an endless loop. If the fault was internal (CPU failure) the motor control device will allow normal operation of the motor, but without the energy saving capability. If the device 11 determines that the fault was external to itself (such as a fault in the motor 3, relay 7, or the power source 5), then the device 11 sill not allow operation of the relay 7. This reduces risk of injury and mitigates system damage.

When the motor 3 turns on, the CPU 34 allows a short interval for normal current conditions to be met. If this interval passes and no current is sensed, an open circuit is detected and a fault indication lamp 42 is lit. Current to the load relay 7 is terminated. If at any time the current exceeds the maximum rated current for the motor control device 11 the fault indication lamp 42 is similarly lit and current to the load relay 7 is terminated. If any current is sensed and there was no command to turn the motor 3 on, the fault lamp 42 is lit and current to the load relay 7 is terminated. When there is a fault indication, the user can display the internal CPU 34 status, and the fault code. The fault code can be used to determine what caused the fault condition. The display 38 is provided for the user to display any two of the following variables at one time: 1) Instantaneous current 2) Normal running current 3) Highest current peak reached since last reset 4) Accumulated energy saved 5) Error word 6) CPU status word.

The display 38 in the prototype is an Emerging Technologies™ product, but is replaceable with Hitachi™ and Sharp™ equivalents.

A Microchip™ PIC16C74 was used as the CPU 34 in the prototype device 11. The application is not limited to this brand or device model, and can be used with others like the Motorola™ 68HC11.

The keyboard 40 used in the prototype device 11 is made up of common industrial push buttons, but could be replaced with better data quality switches or other input devices, not shown.

A motor current transducer 43 acts as the sensor 20 and is replaceable with a two or three phase unit, not shown, so that more powerful motors 3 can be connected with the motor control device 11. For the preferred embodiment, the transducer 43 must be calibrated to put out 0.00 volts D.C. at an input current of 0 amperes A.C., and vary linearly to put out 5.00 volts D.C. at an input current of 128 amperes. This equates to a ratio of 0.0391 volts per ampere. The A/D conversion yields a ratio of 00.5 amperes per data bit.

The CPU 34 has provisions for battery-backup, and push button reset, so that the retention of the energy savings data can be protected.

Figure 5:
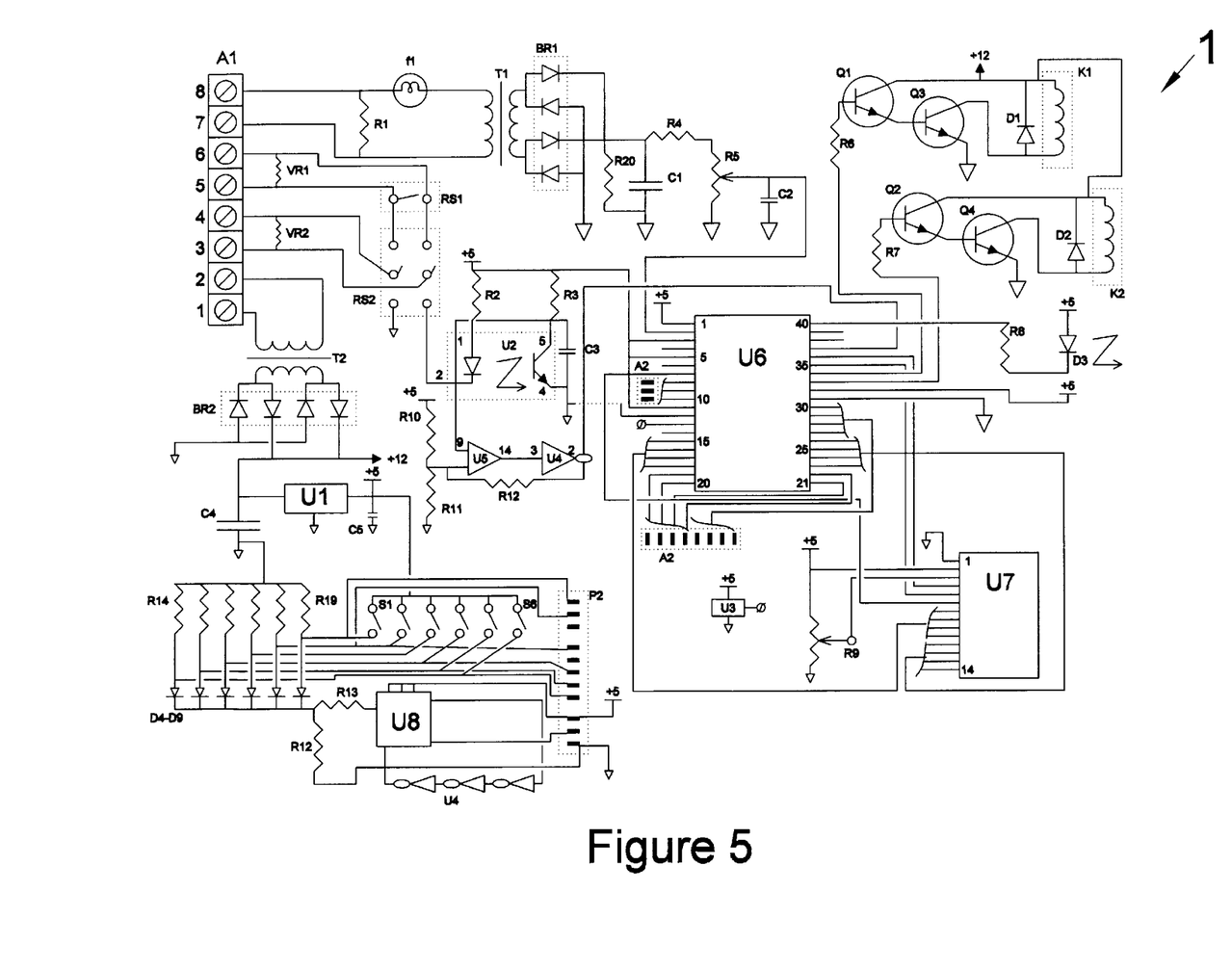
FIG. 5 is a schematic diagram of the motor control device of FIG. 1.

Referring to FIG. 5, all external connections are made via terminal strip A1. The current to the motor 3 is passed through a very low impedance circuit (less than 0.125 ohm) consisting of R1 and T1. It is stepped up by T1 and converted to a steady D.C. value. Trimmer R5 adjusts the output so that 128 amperes of motor current is equal to 5.00 volts. This scaled d.c. potential is then connected directly to an analog-to-digital converter amplifier input of the CPU 34. The CPU 34 converts this scaled value so that 0.5 amperes is equal to 1 data bit.

The switch device control 9 that would normally connect directly to the load relay 7 is connected to the bypass relay RS2 (contacts of K2) (bypass relay 31 of FIG. 4), and then to opto-coupler U2 (opto-coupler 32 of FIG. 4). The output of the coupler U2 is de-bounced by U4 and U5, then passed to the input port of U6 (CPU 34 of FIG. 4).

Current to the load relay 7 is provided by the contacts of RS1 (contacts of relay K1, top right) (motor relay 36 of FIG. 4). Whenever it is determined that the motor 3 should be turned on, K1 closes its contacts (RS1).

The display mode select key switches are S1 through S6. As each one is pressed, a new data variable is displayed on the two-line output device U7 (display 38 of FIG. 4). The keyboard data strobe is produced by US, a D-type flip-flop which is wired to reset on Q output=1. The reset is delayed by the propagation through three stages of U4.

The system clock is 20 megahertz and is provided by U3. The raw output of T2 and BR2 is 12 volts, and is used for the relays. It is passed through U1 to provide 5 volts regulated power for the logic circuits.

Output port data from U6 (CPU) is amplified by Darlington configured Q1–Q3, and Q2–Q4, to drive the relays K1 and K2 respectively. Reverse EMF from both relay coils is suppressed by D1 and D2.

In the event that the input current is too great, F1 will open and protect U6 from overload. VR1 and VR2 suppress EMF from the load relay 7. The CPU 3(U6) will light up D3 in the event of a fault. On power-up, the CPU (U6) lights up D3 during initialization, which lasts less than one second.

The device 11 can:
1) be easy and inexpensive to install.
2) require no programming.

3) adapt to the characteristics of the motor 3 to which it is attached.

4) change its internal calculation variables as the characteristics of the motor 3 change with age and use and, thus, maintain accurate energy measurement.

5) display its measurement data (instantaneous running amperes, peak amperes, normal running amperes) at the users' request.

6) calculate and show the accumulated energy savings (kwh saved).

7) detect faults within itself and allow normal operation in the event of internal failures.

8) detect faults in the motor relay K1 or load relay 7 and discontinue power to the tool 4.

It is also possible to create devices 11 that manage peak demand. Remote Terminal Unit (RTU) versions of the motor control device 11 are also available. In these models, all data is formatted into a fixed message length and held until the device 11 is polled from a central master computer, not shown. Several motor control devices 11 in a general location can be governed by the master computer to prevent inadvertent increases in peak demand power.

Controlling peak demand power is achieved by equipping the master computer with software that monitors instantaneous power usage in all motors 3 throughout an entire plant. The master computer then prevents increases in power consumption past a certain threshold by delaying motor 3 start-ups. The delay would typically be a few seconds, on average, but could amount to significant savings.

Motor 3 start commands would be queued on a first-come first-served basis. As soon as the power level drops to a point where the startup surge for the next motor 3 in the queue will not create a change in peak demand, that motor 3 is allowed to start. Also, the master computer can retain a history of motor data and monitor for changes that indicate a need for scheduled maintenance.

The motor control device 11 can also calculate RMS power. A threshold limit can be set by the operator from a master computer, or by an enhanced keyboard at the input/output module 26. The upper RMS power limit causes the motor 3 to either stop immediately, or keep running between uses. Stopping the motor immediately will enable device 11 to be used for monitoring motors 3 that should be kept running for reasons of safety. This would include motors 3 for compressors, hoists, and conveyors, which can still benefit from RMS power monitoring and master computer control. The operator selects this option for each motor 3. When the RMS power falls below the lower limit the motor control device 11 resumes energy conservation mode.

There can be additional benefits to the device 11. In warmer seasons, excess heat from inefficient motor use increases plant air conditioning requirements. A large manufacturing facility equipped with motor control devices 11 on presses, brakes, and blowers can effectively reduce the plant air conditioning expense.

Electric motors of modem design have a lower idle current when under no load. These newer motors increase the cost-feasibility of the motor control device 11 by automatically increasing the net power saved.

The motor control device can have many different variations, for example:

Model #1: Six display modes, local control only.

Model #2: Six display modes, plus RMS power monitoring and controlling.

Model #3: RTU style; sends six data variables to a master computer via asynchronous serial interface. In this model, the device 11 may be supplied with a proprietary motor control communications protocol, for example DNP 3.0, Tejas Series V, Modbus, and Landis and Gyr WI8979.

Model #4: RTU style; same as model #3, plus has RMS power monitoring. The master computer has control over RMS power correction mode.

Model #5: Full featured: Local display and keyboard, plus serial data I/O. Six data modes plus RMS power monitor.

Models 6–10: Same as 1–5 respectively, but with 3-phase current sensing.

The remainder of this description explains details of an existing prototype device 11 as depicted in FIG. 5. This is a prototype device 11 and is described only as an example of how the principles of the invention may be applied. Those skilled in the art will be able to devise other applications that fall within its spirit and scope. For example, the prototype device 11 lacks a battery backup for data memory. One could be added. Also, the key switches for the keyboard 40 are of the low cost variety and may be responsible for erratic display functions from time to time. Those facts aside, the prototype device 11 has been found to be perform surprisingly well and it is quite rugged.

Processor Type (CPU 34)Microchip PIC 16C74
 13 bit internal architecture, 8 bit data bus
 internal EPROM program memory
 20 MHZ clock rate
 2 clock cycles per instruction, except jumps which are 4 cycles
 internal 8 bit A/D converter
 2 k internal SRAM
 3 I/O buses (8 bit), 1 three-bit control port (PORT-E)
 built in watchdog timer Data Resolution The A/D conversion by CPU 34 determines the basic analog data resolution. Being an 8 bit converter, the raw data resolution is necessarily fixed at 2 bits per ampere.

Program Date

As part of the revision control, the program will display the program date on line 1 at power-up. The date code is read as YYMMDD.

example: "*EPROM*    961112"

This shows a release version dated Nov. 12, 1996.

Instantaneous Current, Peak Current, and Normal Current

These three analog values are computed from raw amperes and displayed in the following format:

"PEAK    127.5"

The least significant digit is resolved to either 0.0 or 0.5 amperes. Although the software is capable of displaying 5 significant digits, the greatest current value will never exceed 127.5, due to the 8 bit A/D converter.

Kilowatt-Hours Saved

The KWH Saved display function resolves to the nearest 5 watt-hours (0.005 kwh). The energy saved is accumulated in a 24 bit register (3 eight bit registers tied together). The counter rolls over at 16,777.215 kwh.

example:    "*KWH*    16,777.215"

Status and Error Words

The Status and Error words are ASCII digits representing the bit states within the error flag byte, and the Status Flag 1 byte. These are internal storage registers used by the program stored in the eprom of the CPU 34 for tracking the states of the motor 3 and the external control 9.

For both of these words, the binary data is read from left to right, with the most significant bit 7 read first and bit 0 read last.

| example: | "STATUS | 00000000" |
|---|---|---|
| bit positions: | | 76543210 |

Display Type

Emerging Technologies™ 2×20 characters, back-lit LCD display, used in 8 bit parallel data mode Power Source Processor and control relay circuits are powered from 120 volt a.c. source, converted to +12 volts d.c. unregulated, and +5 volts regulated d.c.

D.C. grounds are common and connected to chassis ground.

A.C. ground is connected to chassis ground. A step-down transformer isolates A.C. hot and neutral from chassis ground and all internal circuitry.

Load Range

This prototype device 11 is limited to motors 3 which conform to all of these specifications:

| Motor type: | Single phase A.C., 60 hz |
|---|---|
| Normal running amperes ($nra$): | $2 < nra < 30.5$ |
| Peak startup amperes ($psa$): | $30 < psa < 115$ |

Adjustments

There are no field set-up adjustments required. The sensing amplifier 43 in the motor control device 11 is factory calibrated. The program is self-adjusting and adapts to whichever motor 3 it is connected to. Also, if the motor 3 changes with age, the motor control device 11 will automatically compensate for the changes.

Internal and External Relay Specifications

To be compatible with the prototype device 11, an interposing relay 7 must be used to carry the motor current. Select a relay with a contact power rating adequately matched to the motor you will be connecting.

The contacts for both the bypass relay 31 and control relay 36 are rated at 2 amperes, 240 volts. Be sure that the armature rating for the interposer relay 7 you select does not exceed this rating. Of course, greater rated relays could be used for the device 11 to suit alternative situations.

If the interposer relay 7 is to be driven with D.C. current, be sure that the interposer relay 7 is equipped with a shunt diode for back-EMF protection.

Load Type

This motor control device 11 conserves energy by reducing the number of incidents in which the motor 3 is turned off. Typical applications would be blowers, industrial fans, electric presses, electric bending brakes, sanders, shapers, and saws.

Caution

The motor 3 to be controlled must be used for purposes other than compressor type applications, or any other application which requires that the motor 3 cannot remain running between usage demands.

Control Sources

The motor control device 11 is best suited to motors 3 which are already equipped with control devices (such as PLC, RTU, or position sensors) which cause an interposing relay to operate the motor 3 power. A practical application would be at an automatic car wash, for the drying blower at the exit. In general, this device 11 is most favorable toward applications where industrial automation causes frequent start-stop operations, such operations not being compromised if the motor 3 is kept running.

For use with the prototype device, the control 9 signal source must be a SPST contact pair, internally wetted. Wetting potential must not exceed 120 volts a.c., or 50 volts. D.C. As mentioned previously, interposer (load) relays 7 which are driven by D.C. must be equipped with shunt diodes.

Internal Failsafe

Upon any type of reset, the internal microprocessor (CPU 34) checks if the reset was caused by a cold start (normal), or a watchdog reset (abnormal). The watchdog time limit is set at 0.018 seconds, and must be restarted before it lapses. If the timer runs out, an internal reset is generated and a bit is set, indicating that the watchdog was the cause of the reset.

If the microprocessor (CPU 34) should find itself in an infinite loop, or is busy with too many interrupts, it will not be able to restart the watchdog timer.

When the program in eprom of CPU 34 is starting up it checks the watchdog reset status bit and determines if the reset was caused abnormally. If the reset was caused by a watchdog timeout, the program will not engage its internal bypass relay 36. The fault indication lamp 42 will light up, and normal operation of the motor 3 will be possible, but without the power conservation features of the motor control device 11.

Motor Failsafe Limits

The motor control device 11 is designed to detect the following motor 3 faults:

open circuit to the load 3 short circuit at the load 3 illegal current (contact welding)

When these error states are sustained for internally determined time limits, power to the interposer relay 7 is cut and an alarm indicator is lit. The interposer relay 7 coil current will be interrupted within 0.5 seconds of determining the error state. The bypass relay will still be engaged, which prevents normal operation (bypass control) of the motor. The motor control will not operate the interposer relay 7 again until it has been cold booted (powered off, then on).

If the cause of the fault has not been cleared before cold booting, the motor control will return to the error state.

Open Circuit

If the normal running current of the motor 3 should drop below 2 amperes for more than 0.230 second (20 a.c. cycles), this will be regarded as an open circuit.

Short Circuit

If the motor 3 current exceeds 115 amperes for more than 5 a.c. cycles, this will be regarded as a short circuit.

Illegal Current

If there is current greater than 2 amperes at the motor 3 when there is not any current to the interposing relay 7, and this state is sustained for 2.125 seconds (127.5 a.c. cycles) this will be regarded as an illegal current condition. Operation Many motors 3 are burned out by cycling them off, then on again before they have had ample time to dissipate the heat caused during the startup cycle ($I^2R$ losses). Destroying a motor 3 in this fashion is costly in two ways:

1) Replacement and/or repair costs for the motor 3

2) Excess energy used up in the destruction process

By calculating the energy used during cold starts, and comparing it with the energy used during normal idling, the motor 3 control is able to determine the minimum time the motor 3 should be turned off in order to make tuning the motor off cost-effective. This minimum time is referred to as Optimum Off Time.

This energy computation is carried out each time the motor 3 is started. The energy surge is averaged with the previous surges. This prevents extreme calculations due to starting a motor 3 that is under abnormal loading conditions.

Calculation of Optimum Off Time

For each half cycle of power during a startup surge, the current is sampled and summed until the surge current has decreased to normal running current. For each sample taken, the value is reduced by the normal current value before being summed. In this way, the surge energy is calculated net of normal energy consumption.

Then, this energy surge sum is divided by the normal rate of energy consumption to determine the equivalent number of cycles the motor 3 would be able to run at idle (normal) current. This quotient is stored as the Optimum Off Time value, expressed in half-cycles.

Calculation of Energy Saved

When the motor 3 is turned off by the external control 9, (manual switch, PLC, etc.) the time for which it is turned off is accumulated in half-cycles. This value is called the Actual Off Time.

If the motor 3 should be turned on again before the optimum off time has lapsed, the cruise control bit is set by the microprocessor (CPU 34). The next time the motor 3 is commanded to "turn off" by the external control 9, the cruise control bit will keep the motor 3 running until one of two things happens:

Event 1) The actual off time is equal to the optimum off time.

Event 2) The external control 9 commands the motor 3 on again.

In the second instance, the motor 3 remains on, but does so under the influence of the external control 9, not the cruise control bit. The time for which energy is saved is calculated by:

(average surge energy×cruise status)−(energy used to maintain rotation)=Energy Saved Where cruise status equals 0 when cruise control is off and cruise status equals 1 when cruise control is on. Note: if the cruise status is 0, energy saved is a negative value. This value, whether negative or positive, is converted to KWH and added to the KWH saved value.

Figure 6:
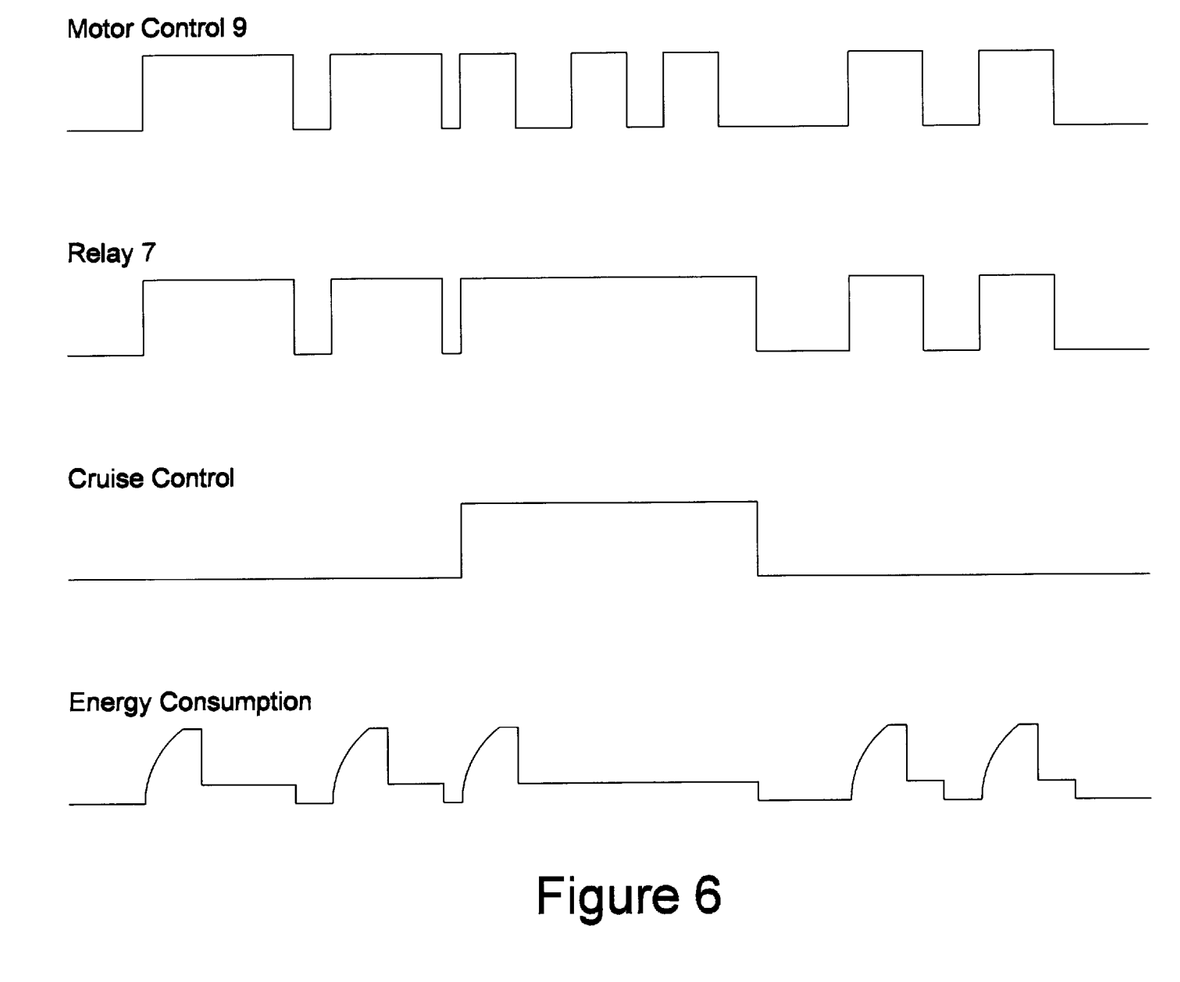
FIG. 6 is a timing diagram for operations within the system of FIG. 1.

The timing relationship between the motor control 9, relay 7, cruise control and energy consumption is shown in FIG. 6.

The energy saved is summed for each time Event 2 occurs, and can be read via the front display panel 38 as KWH (kilowatt-hours saved). This is the energy saved that would have otherwise been used to burn out the motor 3 with $I^2R$ losses.

This calculation is performed each time the external control 9 turns the motor 3 on. The microprocessor program in CPU 34 automatically determines optimum off time, normal running current, surge current, and energy saved. Thus, there is no need for setting up the motor control device 11 for the particular characteristics of the motor 3. As the motor 3 ages and its characteristics change, the motor control device 11 adjusts accordingly.

Fault Indication

On power-up, the fault indicator lamp 42 blinks once. This indicates that the processor (CPU 34) successfully passed all initialization tests.

A fault indication that is on solid indicates that there is a serious fault with one (or more) of the following components:

| | |
|---|---|
| 1 | motor 3 |
| 2 | interposer relay 7 (load relay) |
| 3 | supply of power to the motor 3 |
| 4 | the motor control device 11 |

Fault Shutdown Sequence

If the microprocessor (CPU 34) detects a fault condition, the following events will occur in the sequence shown:

1) The instantaneous current value will be displayed on display 38.

2) The error word is displayed on the next available line.

3) The fault indicator lamp 42 is turned on.

4) The internal driver relay 36 is turned off. (The Bypass relay 31 remains on.)

5) The microprocessor (CPU 34) is purposely trapped into an endless loop, effectively locking out the keyboard 40 and motor control 9.

While the fault indicator lamp 42 is lit, it is not possible to make the motor 3 run, because the bypass relay 31 will not switch to bypass mode and energize the motor relay 36.

Error Word

When a fault occurs, the error word is displayed on display 38 along with the last instantaneous current value (Inst. Amps.). The following chart indicates what the fault is, as "seen" by the motor control device 11.

| Error Bit | Fault condition | Inst. Amps. |
|---|---|---|
| 7 (left-most) | Watchdog timeout caused a system reset. | Any value |
| 6 | False interrupt detected. | Any value |
| 5 | (not used) | Any value |
| 4 | Manual reset (does not cause fault indication). | Any value |
| 3 | Test mode (does not cause fault indication). | Any value |
| 2 | Illegal current detected. | more than 2 amperes |
| 1 | Over-current detected. | more than 115 amperes |
| 0 | Open circuit detected. | less than 2 amperes |

Fault Lamp Lit, Error Word All Zeros

If a fault condition occurs, and the error word shows eight zeros ("ERROR 00000000"), it is likely caused by electrical interference. Impulse noise may cause the processor (CPU 34) to jump to the end of its memory. That is where the program traps the processor (CPU 34) and forbids it to make computations on false data. This extra safety measure prevents a "lost" processor (CPU 34) from making possibly hazardous control operations.

Fault Lamp Lit, No Error Word

When the internal driver relay 36 releases during a moment when the motor 3 current is very high, the resultant noise impulse (back-EMF) can cause the data display 38 to lose all or part of the error word. By having the fault lamp 42 on, and reading the instantaneous current value, the error bit can be determined by looking at the error word chart.

Corrective Actions

The following sections are intended to speed up the fault isolation process. These guidelines are in no manner intended to be a substitute for proper test and measurement. Proper dynamic and static system tests should always be made with the proper calibrated test equipment before drawing any conclusions on what the cause of a fault might be.

| | |
|---|---|
| Illegal Current | This is caused when the motor 3 is receiving current and there is no logical reason for it (not energizing the interposer relay 7). It is likely caused by the interposer relay 7 or driver relay 36 having welded contacts. If the interposer relay 7 is at fault, the motor 3 will continue to run when either the Relay 1 or Relay 2 wire to the relay 7 is disconnected. |
| Open Circuit | If the motor control device 11 issues an on command to the motor 3 through the relay 7, and the current to the motor 3 does not rise within the specified time, an open circuit fault is displayed. The internal driver relay 36, interposer relay 7, or power source 5 could be the cause.<br>An internal fuse f1 protects the current sensing amplifier 43. If this fuse f1 is open, the open circuit fault will occur when the motor 3 is commanded on. This is easily determined by seeing if the motor 3 starts after unplugging the A.C. power cord for the motor control device 11. |
| Over-Current | An over-current (short circuit) fault is displayed if the motor control device 11 detects 5 continuous cycles of power exceeding 115 amperes. The prototype motor control device 11 current sensing circuit cannot endure current greater than this limit. For its own protection, the current to the interposer relay 7 is terminated. Under extreme conditions, the internal protection fuse f1 may open (see Open Circuit).<br>If this occurs, the rating of the motor 3 should be checked. The surge current should not normally exceed 6 times the rated idling (no work load) current. For Nema ™ type B motors, this prototype motor control device 11 can safely handle motors 3 rated at 18 amperes at no load, and 29 amperes under full load. If the motor 3 is rated at less than these maximum limits, there is a fault with the motor 3. Suitable repairs should be made before attempting to reuse the motor control device 11. |
| Bypass Mode | If a fault occurs and it is not caused by the motor 3 or its associated wiring (including the interposer relay 7 and power source 5), the motor control device 11 may be at fault.<br>The program in CPU 34 may detect an internal fault upon power-up. This will automatically cause the motor control device 11 to revert to bypass mode. Bypass mode allows the same level of control as if the motor control were not wired in circuit with the interposer (load) relay 7.<br>To operate in bypass mode, disconnect A.C. power to the motor control device 11. The connector terminal Control 1 (A") is automatically connected to Relay 1 (A), and Control 2 (B") is connected to Relay 2 (B). This allows normal operation of the motor 3 by whichever control 9 is used to turn the motor 3 on and off. |

Push Buttons

In the prototype device 11, there are six push buttons on the keyboard 40 for selecting display modes. They are:

| | |
|---|---|
| 1)Normal Current | 4)Instantaneous Current |
| 2)Peak Current | 5)Error Word |
| 3)KWH Saved | 6)Status Word |

When any one of these buttons is pushed, the data will be displayed on alternating display lines. For instance, if the most recently selected data was displayed on line 1, the next selection is displayed on line 2.

If the internal data value changes, only the latest displayed data selection will be updated.

After initial power-up, the program date is displayed on line 1. Press button #4, "Instantaneous Current". The current value is displayed on line 2. If the motor 3 is running, the data displayed after the decimal point may change rapidly, due to the minor fluctuations in the motor 3 current. If another button is pressed, the instantaneous current value will freeze on its last reading. The next data value will be displayed on line 1, by writing over the program date.

Data Interpretation

The data values can provide the following information:

| |
|---|
| 1Need for scheduled motor servicing |
| 2Improper (abusive) motor loading |
| 3Energy savings |
| 4System state |

Making any of the above determinations requires that periodic readings are taken from the motor control device 11 and logged, for example in a chart, or an electronic spreadsheet.

Normal (Idle) Amperes

As the motor 3 reaches its rated RPM after being turned on, the current drops to a level near the rated current for the motor 3. When the motor 3 current has remained at a stable level for one second (120 half-cycles), the value is recorded as the normal current. This recorded value is used to compute the minimum time for which the motor 3 must be turned off, if turning the motor 3 off is to be economical.

When the motor control device 11 is first powered up, the normal current value is defaulted to 4 amperes. This is because a nominal value is required for calculating the net energy consumed during the first power surge. After the first power-up, this default is changed to an actual current value.

By recording the normal current for the motor 3 when first connected to the motor control device 11, you can compare later readings on a periodic basis. The reading should be taken at equal intervals to determine trends toward increased normal current. This is a first indication that the motor 3 is in need of a scheduled rebuild. It can also mean that someone is putting an abusive load on the motor 3, especially if the change is happening much sooner than expected given the life expectancy of the motor 3.

Instantaneous Amperes

Every half cycle (120 times per second) the microprocessor (CPU 34) reads the motor 3 current value from the sensing amplifier (or transducer 43) made up of T1, BR1, R20, R4, C1, R5, C2. This value is the basis of all internal calculations.

It is quite normal for this value to vary by a half ampere. For a motor 3 rated at 5 amperes under normal load, this means the instantaneous current can vary from 4.5 to 5.5 amperes. When the instantaneous current is the most recently selected data mode, the numbers may appear distorted due to this rapidly changing value. At the moment another display button is pressed the most recent current reading will remain frozen on the display 38.

A current reading can be taken while the motor 3 has an increased load. In this way, it can be determined if the load is abnormal, given the load ratings of the motor 3. If abnormal loading is indicated, either the motor 3 needs to be changed for a more powerful unit, or the gear/pulley ratios need to be changed. Otherwise, the manner in which the machinery is being handled may need to be adjusted.

Peak Amperes

When the motor 3 first starts the current it draws rises sharply until it reaches at least five times its rated current. Depending on the motor 3 and how heavily loaded it is, the current remains high for a number of seconds, then begins to drop rapidly. The program keeps track of the highest current reading and stores it as peak amperes. This highest reading is retained until the motor control device 11 is reset.

As motors 3 get used, they reach a point in their useful life span when their efficiency drops due to friction and worn connections. This effect may be shown by an increase in the peak amperes drawn upon cold starts. By recording the peak current at the same time as the normal current, you can observe trends in motor 3 aging and, thus, predict an eventual breakdown before it happens.

Trends in Normal and Peak Amperes

Every motor 3 has an estimated number of useful hours, under normal loading and environmental conditions. By having the motor control device 11 installed within an electric motor control system 1, the maximum rated life span from the motor 3 may be achievable. Motor 3 failures would point to failure due to manufacturer's defects, which will likely occur while the motor 3 is covered under warranty. Research shows that many warranty claims are filed due to breakdown caused by excessive heat, which is caused by too many restarts. The motor control device 11 could reduce this type of failure.

One type of failure that the motor control device 11 cannot help prevent or predict is a sudden internal open circuit within the motor 3 under normal loading conditions. This type of defect is typically a result of poor quality wire being used in the motor 3 windings, and, in the case of a slip ring motor 3, poor quality brushes or slip rings.

During the normal useful life of the motor 3 the normal current draw and the peak current reached at start-up will remain fairly constant. That is, when these values are recorded on a periodic basis, one expects to see very little variation in either of these values over the predicted life span of the motor 3. At some point a defect will begin to develop. This defect will cause a sharp upward trend, probably in both peak and normal current. For motors 3 equipped with slip rings and brushes, the wear and tear on these internal parts may cause a downward trend in either the peak or normal current. Regardless, either an upward or downward departure from normal readings may indicating a need for decommissioning the motor 3.

Allowing any change in current to go unheeded will cost money in the form of electricity wasted by an inefficient motor 3. More importantly, the motor 3 will break down during a period of heavy usage, and that is exactly when businesses can least afford the downtime. By detecting these changes early, scheduled service can be performed for the machinery when it is most convenient.

When an exchange motor 3 is installed, the old data records are to be discarded and a new set of charts started. No adjustments are necessary to the motor control device 11, even if the ratings of the new motor 3 are not the same as the previous motor 3. The motor control device 3 automatically "learns" the characteristics of any motor 3 used with it.

Kilowatt-Hours Saved

Electricity costs money. Depending upon where the company is located, and what bulk rate is applied to its usage, one could be paying about 6 cents $Canadian to 18 cents $U.S. per kilowatt-hour (KWH) in various parts of Canaada and the United States. There is no point paying for electricity used up in heat which just burns out motors 3 prematurely. That is exactly what happens to motors 3 that are stopped and started too frequently.

The KWH data mode of the device 11 shows an accumulation of energy saved. This saving is calculated net of the energy used in keeping the motor 3 idling between duties. When the motor control device 11 is reset for whatever reason, this accumulated value is zeroed. This value should be recorded, in case the motor control device 11 is reset. If a reset does occur, the new reading can simply be added to the last recorded reading.

The net energy savings can be calculated by multiplying the charged rate against the KWH reading. See the case example below:

A miter saw 4 in a window factory is used on average eight hours per day, taking into account weekends and holidays. The saw runs at 120 volts, 10 amperes under normal loading. Over one year this equates to 10×120× 8×365=3,504,000 watt-hours. To determine KWH, divide 3,504,000 by 1000=3,504 KWH. At a charge rate of $0.10 per KWH, this equates to $350.40 of electricity per year.

Before the motor control device 11 was installed, the miter saw 4 was turned off and on once per minute (once for each cut, on average). For this particular saw, this was the equivalent of using 3 minutes of energy for every minute of use. The annual electricity bill came to $1050, and the saw 4 needed frequent bearing service.

After the motor control device 11 is installed, the bill would return to normal annual usage ($350), and the service costs would be drastically reduced; a saving in excess of $700 per year, not counting down-time and motor rebuilding.

This case example is fictional, but is based on the characteristics of a normal saw 4 in a normal factory. Therefore, the savings are not by any means an exaggeration. Actual energy saved will be indicated by the KWH readings taken periodically, for each individual motor 3 and its circumstances of usage.

Status Word

The status word can be displayed at any time. The display 38 will appear similar to the following:

| example: | "STATUS | 01101111" |
|---|---|---|
| bit number: | | 76543210 |

Any time one of the bits shows a 1 instead of 0, that means the state indicated by the bit is true. The following chart describes what each status bit means:

| Bit # | Name | Purpose |
|---|---|---|
| 7 | — | (not used) |
| 6 | I_PRES | There is current present at the motor 3 (greater than 2 amperes). |
| 5 | I_NORM | The motor 3 has settled down to its normal running current (end of surge). |
| 4 | CALL | The external control 9 is commanding the motor 3 be on. |
| 3 | PASS 1 | The motor 3 has completed at least one full surge cycle. |
| 2 | CRUISE | The motor control device 1 lhas determined to keep the motor 3 running the next time it is commanded off by the external control 9. |
| 1 | MOTOR | The motor driver relay 36 is being commanded on by the motor control device 11. |
| 0 | BYPASS | The bypass relay 31 is being commanded on by the motor control device 11. Note: When the bypass relay 31 is off, the motor control device 11 is bypassed, allowing the external control 9 to control the motor 3 directly. |

Error Word

The error word can be displayed at any time; however, when manually displayed, it will likely show all bits with zero values. That is because most error bits cause the keyboard 40 and motor control circuits to be locked out.

The error word is displayed automatically whenever an error is detected. The following chart describes what each error bit means:

| Bit # | Name | Purpose |
|---|---|---|
| 7 | WDTO | A reset has occurred which was caused by a watch-dog timeout. Usually this is an indication that the processor (CPU 34) received a power spike, or static electricity discharge, and was caused to enter into an endless loop. |
| 6 | False Interrupt | An interrupt was received for which there is no program vector. The cause is typically the same as for the WDTO bit. |
| 5 | — | (not used) |
| 4 | TEST | Factory use: To allow calibration without causing a fault condition. |
| 3 | — | (not used) |
| 2 | ILLEG_I | An Illegal Current fault has been detected. |
| 1 | OVER_I | An Over-Current fault has been detected. |
| 0 | O_CCT | An Open Circuit fault has been detected. |

Referring to FIG. 5, the parts listed are:

| | | |
|---|---|---|
| Semiconductors: | | |
| BR1 | diode bridge, 100 volt, 3 amp | |
| BR2 | diode bridge, 100 volt, 3 amp | |
| D1 | rectifier, 1N4005 | |
| D2 | rectifier, 1N4005 | |
| D3 | L.E.D., red, low power | |
| U1 | regulator, LM7805 | |
| U2 | opto-coupler, TIL-117 | |
| U3 | oscillator, K1115AM, 20 mhz | |
| U4 | hex inverter, 4049 | |
| U5 | comparator, LM339N | |
| U6 | CPU, P1C16C74/JW | |
| U7 | display, EC 16220 (Emerging) | |
| VR1 | varistor, 160 working volts | |
| VR2 | varistor, 160 working volts | |
| Q1 | transistor, 2N2222 | |
| Q2 | transistor, 2N2222 | |
| Q3 | transistor, 2N3053 | |
| Q4 | transistor, 2N3053 | |
| Capacitors: | | |
| C1 | 47 mf @ 63 v | |
| C2 | 1 mf @ 35 v | |
| C3 | .1 mf @ 25 v | |
| C4 | 2200 mf @ 35 v | |
| C5 | 1 mf @ 35 v | |
| Connectors: | | |
| A1 | 8 pole, 600 volt @ 30 amp. | |
| A2 | 14 pin D.I.P | |
| Switches: | | |
| S1–S6 | SPST momentary make | |

-continued

| | | |
|---|---|---|
| RS1 | SPST, part of K1 | |
| RS2 | DPDT, part of K2 | |
| Relays: | | |
| K1 | 12 vdc coil, 10 amp @ 30 vdc | |
| K2 | 12 vdc coil, 10 amp @ 30 vdc | |
| Fuse: | | |
| F1 | 5 ampere, slow | |
| Resistors: | | |
| All resistors ⅛ watt unless otherwise specified | | |
| R1 | .12 ohm, 50 watt | |
| R2 | 100 ohm | |
| R3 | 4.7 k | |
| R4 | 82 k | |
| R5 | 10 k multi-turn, linear pot. | |
| R6 | 4.7 k | |
| R7 | 4.7 k | |
| R8 | 680 ohm | |
| R9 | 1 k linear pot, pc mount | |
| R10 | 4.7 k | |
| R11 | 4.7 k | |
| R12 | 68 k | |
| R13 | 100 ohm | |
| R14–R19 | 8.2 k | |
| R20 | 220 ohm | |
| Transformers | | |
| T1 | 120–12.6 volt, 1 amp secondary | |
| T2 | 5.0–120 volt, 1.2 amp primary (used in reverse) | |

SUMMARY OF APPLIED CALCULATIONS

1. Energy consumption during start-up:

The energy consumed by the motor during startup is mostly resistive until the motor reaches its rated RPM. This energy is converted to heat. The very small portion of energy that is measured due to inductive loading is converted to kinetic energy as the motor accelerates. Once the motor reaches its rated RPM the resistive load rapidly decreases to near zero and the inductive loading becomes the major consumer of electrical energy. The motor reaches an equilibrium with its rotational force equal to the electric potential force, and that is why current drops to its lowest possible value for the motor.

The startup energy is measured in joules and is the energy used during the resistive loading phase. It happens from T=0 (moment of power being applied) to T=N, where N represents the moment in time when the current has reached its minimum, which is the nominal rated current for the motor.

In the prototype environment the electrical power supply is well regulated at 120 volts. Because of this advantage, the time, T, is measured in intervals of 1/120 second. The reason for this will soon become apparent. The electronic circuits of the prototype device 11 sample the current by reading a D.C. voltage that is proportional to the instantaneous motor current.

Being that Joules=Watts×Seconds, and Watts=Volts×Amperes, we can say that:

Joules=120×1/120×Amperes

The volts and time are reciprocals, leaving current (amperes) to be equal to joules for each 1/120 of a second.

Therefore, for each sample time, we can take the value read as current and treat it as a reading for joules. These values are accumulated for each sample until the load current has reached its nominal normal running level (steady-state energy consumption). The final accumulation gives us the net energy consumption during the startup surge, and it is measured in joules.

The prototype of the invention can be easily modified so that the sample time is factored to compensate for variations in electrical potential. For example, if the potential decreases by 10%, it would cause a proportionally high error in energy conversion. This is easily corrected by taking 10% fewer samples per second. The modification would require an additional transducer, not shown, that would provide a proportional DC sample of the power supply voltage 5 to an unused A/D input channel on the microprocessor 34. Minor corresponding changes to the software would also be required.

2. Steady-state energy consumption rate:

The steady-state rate of consumption is determined in a similar manner as the energy consumption during startup: The sample rate is the reciprocal of the electrical potential. In this way, the sampled current is equal in value to the energy converted (consumed) during that sample time. The device 11 can thus use this value:

a) to represent the energy converted during each sample interval for steady-state in joules b) as input data for calculating the net energy saved each time the device 11 is activated 3. Equivalency Time:

Since it is correct (for device 11) to use this value to represent either the current (in amperes) or energy (in joules) we can use it to determine the length of time that the motor could be sustained at a steady-state current, if the energy consumed during startup were used only for steady-state consumption (equivalency time). The equivalency time is important because it represents the economic break-even point at which it makes no difference to turn the power off and on again, or to leave it running at steady-state.

This can be represented by the equation:

$$T_{eq}=J_{sg}/J_{ss}$$

Where Teq is the equivalency time in units of 1/120 second, Jsg is energy used during one startup, and Jss is the energy used during each sample interval in steady-state.

Periods of time greater than the $T_{eq}$ represent periods that are more economical to turn off the power. Periods of time less than the $T_{eq}$ represent periods that are more economical to keep the power applied.

4. Determination of Self-Activation:

The device 11 must determine when to activate itself and enter into "cruise control" mode. This activation is due to a measured trend in motor usage, and that trend indicates that the next time the motor is turned off it is likely to be turned off for a period that is less than $T_{eq}$.

This determination can be represented by the relational expression:

Cruise Control is true when $T_{off} < ((T_{eq1}+T_{eq2})/2)$

The device 11 calculates the average $T_{eq}$ value and compares it to the time that the motor is actually kept off between uses. If the actual off time drops below the $T_{eq}$ value the "cruise control" is set ON, and the device is said to be activated.

5. Determination of Self-Deactivation:

The device 11 must determine when to deactivate itself and leave "cruise control" mode. As mentioned before, $T_{eq}$ is the break-even point for the energy consumption economic factors. If the user-activated signal to disconnect the power from the load has been present for a period longer than $T_{eq}$, then it is no longer economical to keep power applied to the load. The "cruise control" mode is turned OFF and the device 11 is said to be deactivated. This immediately causes power supplied to the load by the device 11 to cease.

6. Calculation of Net Energy Saved:

The energy saved is given by the following formulae:

For each time the user-activated control 9 is off for less than $T_{eq}$:

$$J_{saved2}=J_{saved1}+(J_{surge}-J_{cruise})$$

Where $J_{saved2}$ is the resulting net energy saved, $J_{saved1}$ is the previous net energy saved, $J_{surge}$ is the energy used during a surge (same as energy consumed at steady-state for $T_{eq}$), and $J_{cruise}$ is energy used at steady-state for the time the device 11 is waiting for control 9 to be reactivated.

For each time the device 11 is activated (cruise control=ON) and the device 11 deactivates itself because the control 9 was not reactivated before $T_{eq}$ expired:

$$J_{saved2}=J_{saved1}-J_{surge}$$

The net energy saved is accumulated in a small accumulator until it reaches a value greater than the equivalent of 0.05 kilowatt hour. This equivalent amount is subtracted from the small energy accumulator, and the large accumulator is increased by 0.05 kilowatt hour. The large accumulator is 24 bits wide. The data is later converted to ASCII and communicated to the I/O module 26 on demand.

7. Determination of Steady State Current ("Normal Amperes"):

The device 11 must be able to overcome electrical system noise and spurious variations in the signal that is electronically derived from the load current. Otherwise, the device 11 may arrive at greatly differing values each time it attempts to sense the steady-state current.

Two things must be done to accomplish this computation:

a) determine that steady-state current has been established (end of surge)

b) read the current at the moment the steady-state is detected

Noise is filtered by averaging each new current sample with all previous samples. This is represented by:

$$I_{avg2}=(I_{avg1}+I_{new})/2$$

The device 11 determines that the steady-state is established as follows:

$\Delta I_{avg}<1.0$ amperes, for 120 consecutive readings (one second)

As soon as the above relational expression is true the average value is copied to a new register and stored as the new value for normal amperes.

8. Determination of Peak Current ("Peak Amperes"):

For every sample read by the device 11, if the newest reading is greater than the reading stored in the peak amps register, the peak amps register is overwritten with the new sample. The register will contain the highest current value ever read until the device 11 is forced to reset.

It will be understood by those skilled in the art that this description is made with reference to the preferred embodiment and that it is possible to make other embodiments employing the principles of the invention which fall within its spirit and scope as defined by the following claims.

I claim:

1. A control system comprising: a load, a load power source, an external control signal, and a control device, the control device is connected between the power source and the load, the control device receives the external control signal, and the control device measures the amount of energy consumed by the load during start-up and measures the rate of energy consumption by the load during steady state, the control device determining an equivalency time as the amount of time the load will take to consume the same energy in steady-state that the load consumes during start-up, the control device connecting the power source to the load after the external signal indicates that the load should be disconnected from the power source for the equivalency time, and the control device disconnecting the power source from the load unless the external signal indicates within the equivalency time that the power source should be reconnected to the load.

2. The control system of claim 1, wherein the control device comprises: a power sensor for sensing the power consumed by the load at any one time, and a processor for accumulating the total energy during start-up and determining the equivalency time.

3. The control system of claim 2, wherein the load comprises a load relay and a motor, the control device connecting the power source to the motor, and disconnecting the power source from the motor, by switching the load relay.

4. The control system of claim 3, wherein the control device further comprises a signal sensor for sensing the state of the external signal and passing the state to the processor.

5. The control system of claim 4, wherein the control device determines the equivalency time each time the control device connects the load to the power source.

6. The control system of claim 5, wherein the control device detects load current faults and interrupts current to the load relay as a result of detecting such a fault.

7. The control system of claim 5, wherein the control device permits normal operation of the load relay in the event of internal control device failure.

8. The control system of claim 5, wherein the control device allows the user to display instantaneous current, normal load current, highest peak current, and accumulated energy savings.

9. The control system of claim 5, wherein the control device is not limited to any single type of electric motor, nor any range of operating current by virtue of accepting input transducers of different scaling ratios and current handling specifications, including three phase input transducers which combine the effects of the three power phases into one output potential.

10. A control device for use with a load, a load power source, and an external control signal, the control device comprising: means for activating a connection between the power source and the load, means for receiving the external control signal, means for measuring the amount of energy consumed by the load during start-up, means for measuring the amount of energy consumed by the load over time during steady state, means for determining an equivalency time as the amount of time the load will take to consume the same energy in steady-state that the load consumes during start-up means for activating a connection between the power source and the load after the external signal indicates that the load should be disconnected from the power source for the equivalency time, and means for activating a disconnection between the power source and the load unless the external signal indicates within the equivalency time that the power source should be reconnected to the load.

11. The control device of claim 10, wherein the means for measuring the amount of energy consumed during start-up and the means for measuring the amount of energy consumed during steady state include a power sensor for sensing the power consumed by the load at any one time and include a processor for accumulating the total energy during start-up and determining the equivalency time.

12. The control device of claim 11 further for use with a load having a load relay and a motor, wherein, the means for activating a connection between the power source and the load, and the means for activating a disconnection between the power source and the load, activate by switching the load relay to connect and disconnect, respectively, the power source and the motor.

13. The control device of claim 12, further comprising a signal sensor for sensing the state of the external signal and passing the state to the processor.

14. The control device of claim 13, wherein the control device determines the equivalency time each time the control device connects the load to the power source.

15. The control device of claim 14, wherein the control device detects load current faults and interrupts current to the load relay as a result of detecting such a fault.

16. The control device of claim 14, wherein the control device permits normal operation of the load relay in the event of internal control device failure.

17. The control system of claim 14, wherein the control device can display instantaneous current, normal load current, highest peak current, and accumulated energy savings.

18. The control system of claim 14, wherein the control device is not limited to any single type of electric motor, nor any range of operating current by virtue of accepting input transducers of different scaling ratios and current handling specifications, including three phase input transducers which combine the effects of the three power phases into one output potential.

* * * * *